US 9,125,154 B2

(12) United States Patent
Chawla et al.

(10) Patent No.: US 9,125,154 B2
(45) Date of Patent: Sep. 1, 2015

(54) METHOD AND APPARATUS FOR REDUCING POWER CONSUMPTION OF SIMULTANEOUS RECEIVERS IN A WIRELESS COMMUNICATIONS DEVICE

(75) Inventors: Vivek Chawla, San Diego, CA (US); Shuqing Xing, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 417 days.

(21) Appl. No.: 13/585,612

(22) Filed: Aug. 14, 2012

(65) Prior Publication Data
US 2014/0051476 A1 Feb. 20, 2014

(51) Int. Cl.
*H04M 1/00* (2006.01)
*H04W 52/02* (2009.01)
*H04W 88/06* (2009.01)

(52) U.S. Cl.
CPC .......... *H04W 52/0209* (2013.01); *H04W 88/06* (2013.01); *Y02B 60/50* (2013.01)

(58) Field of Classification Search
CPC .................................................. H04W 52/0261
USPC .................................. 455/552.1, 161.1, 186.1
See application file for complete search history.

(56) References Cited

U.S. PATENT DOCUMENTS

2009/0068969 A1 3/2009 Lindoff et al.
2009/0088108 A1 4/2009 Granlund et al.

FOREIGN PATENT DOCUMENTS

CN 101861752 10/2010
CN 102625326 8/2012

*Primary Examiner* — Hsin-Chun Liao (57) ABSTRACT

A method for power management for use in system selection by simultaneous receivers taking into account power use during an idle state. A power penalty is determined for each of a plurality of wireless technology systems available to a receiver when conducting page monitoring sequences. Combined power penalties are determined for various combinations of wireless technology systems. Wireless technology systems are selected in a preferred combination having a least combined power penalty for monitoring pages during an idle mode.

15 Claims, 8 Drawing Sheets

METHOD AND APPARATUS FOR REDUCING POWER CONSUMPTION OF SIMULTANEOUS RECEIVERS IN A WIRELESS COMMUNICATIONS DEVICE

BACKGROUND

Mobile telecommunication networks traditionally supported a single service dedicated to handle voice calls. Eventually, separate data related services were supported over the mobile network. Receivers have evolved to handle two or more services (e.g., voice, data, Dual SIM, etc.) simultaneously. For instance, simultaneous voice and data capability has been introduced into the telecommunications industry. That is, a user could utilize both a voice service as well as a data service at the same time. In that case, the user could be conducting a voice call with a calling partner and simultaneously send or receive email that is relevant to the conversation. More particularly, simultaneous receivers are configured to maintain circuit switched connection with a designated network for voice service, and at the same time maintain another connection with another system in that network for handling data service.

However, when a receiver is connected to multiple systems (e.g., voice and data), the receiver consumes more power. This is because the receiver must monitor and process the signal from multiple wireless technology systems simultaneously. As an example, the receiver must monitor for pages coming from the different wireless technology systems indicating that the receiver is a target for voice or data communications. In this case, the receiving device drains its battery much more quickly than a device that is monitoring a single wireless technology system. The problem is exacerbated when there are multiple wireless technology systems to choose from for a receiving device. For instance, a chosen system to provide voice service may be selected from two or more available systems that provide voice service. Similarly, a chosen data system may be selected from multiple data systems in the network.

Voice and data systems chosen for a communication device may be set to default systems. This configuration may not be well suited to a environment at a particular point in time, and especially for dynamically changing RF environments. Additionally, system selection for a receiver at a particular point in time is typically performed by evaluating one or more performance factors. For instance, when choosing between two or more systems, a receiver may consider quality of service (QoS) parameters, signal quality, band preference, scheduling, etc.).

SUMMARY

An apparatus for managing power in a wireless communication device that includes considering power penalties. The apparatus includes a wireless receiver that is configured to receive & process signals from a plurality of wireless technology systems simultaneously. Additionally, the apparatus includes a system determination module that determines available systems for each type of supported wireless technology and then select one or more available systems to register for communication. For instance, the module is able to determine the Circuit-Switched voice systems available to the wireless receiver. Also, the system determination module is configured to determine one or more combinations of wireless technology systems selected from the plurality of wireless technology systems supported by the wireless receiver device. Further, the apparatus includes a power penalty monitor that determines a power penalty for maintaining connection with each of the plurality of wireless technology systems. In particular, the power penalty is associated with a page monitoring wake-up sequence that is performed when the wireless communication device is operating in an idle mode. The apparatus also includes a section module that determines one or more power penalties for one or more combinations of wireless technology systems that are selected from the plurality of wireless technology systems. A preferred combination includes selected wireless technology systems that have the least combined power penalty and still meet other required system selection criteria.

In another embodiment, a method for power management as implemented by a wireless communication device is described. The method includes determining a plurality of wireless technology systems that a wireless receiver is capable of page monitoring, such as, during a wake-up sequence when in an idle mode. The method further includes determining a power penalty for each of the plurality of wireless technology systems during a wake-up sequence. The method also includes determining one or more combined power penalties for various combinations of wireless technology systems selected from the plurality of wireless technology systems. The method also includes determining a least combined power penalty that is associated with a preferred combination. The method further includes selecting wireless technology systems in the preferred combination for purposes of monitoring pages from these wireless technology systems when the wireless communication device is in an idle mode.

In some embodiments, an apparatus includes a tangible, non-transitory computer-readable storage medium having stored thereon, computer-executable instructions that, when executed causes the computer system to perform a method for power management as implemented by a wireless communication device. The method includes determining a plurality of wireless technology systems that a wireless receiver is capable of page monitoring. The method further includes determining a power penalty for each of the plurality of wireless technology systems during a wake-up sequence implemented for purposes of page monitoring. The method also includes determining one or more combined power penalties for various combinations of wireless technology systems selected from the plurality of wireless technology systems. The method also includes determining a least combined power penalty that is associated with a preferred combination. The method further includes selecting wireless technology systems in the preferred combination for purposes of monitoring pages from these wireless technology systems when the wireless communication device is in an idle mode.

In another embodiment, a computer system comprises a processor coupled to memory having stored therein instructions that, if executed by the computer system, cause the computer to execute a method for power management as implemented by a wireless communication device. The method includes determining a plurality of wireless technology systems that a wireless receiver is capable of page monitoring. The method further includes determining a power penalty for each of the plurality of wireless technology systems during a wake-up sequence implemented for purposes of page monitoring. The method also includes determining one or more combined power penalties for various combinations of wireless technology systems selected from the plurality of wireless technology systems. The method also includes determining a least combined power penalty that is associated with a preferred combination. The method further includes selecting wireless technology systems in the preferred combination for purposes of monitoring pages from these wireless technology systems when the wireless communication device is in an idle mode.

In still another embodiment, a method for power management as implemented by a wireless communication device is disclosed. The method includes determining a plurality of wireless technology systems that a wireless receiver is capable of page monitoring, such as, during a wake-up sequence when in an idle mode. The method further includes determining at least one combination of wireless technology systems, wherein each combination comprises one or more wireless technology systems of at least a first type. The method also includes determining one or more combined power consumption penalties for the combinations of wireless technology systems. The method further includes determining a least combined power penalty associated with a preferred combination. The method also includes selecting wireless technology systems in the preferred combination for operation by the wireless communication device when operating in an idle mode.

These and other objects and advantages of the various embodiments of the present disclosure will be recognized by those of ordinary skill in the art after reading the following detailed description of the embodiments that are illustrated in the various drawing figures.

BRIEF DESCRIPTION

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Accordingly, embodiments of the present disclosure illustrate the implementation of a power-aware system selection technique to reduce the power consumption of any multi-mode wireless receiver when operating in simultaneous mode, thus efficiently using power and/or extending battery life. Embodiments of the present disclosure also provide for considering power consumption as a factor when performing system selection to select wireless technology systems to camp on during an idle mode.

Throughout the present application, the term "system" is used to indicate a particular telecommunications technology (e.g., 2G, 3G, 4G, Wi-Fi, etc.) providing various services (e.g., voice, data, etc.), as implemented through one or more network infrastructures. Specifically, for each system, one or more supporting networks may be associated with one or more service providers providing the infrastructure to support the one or more services.

Figure 1:
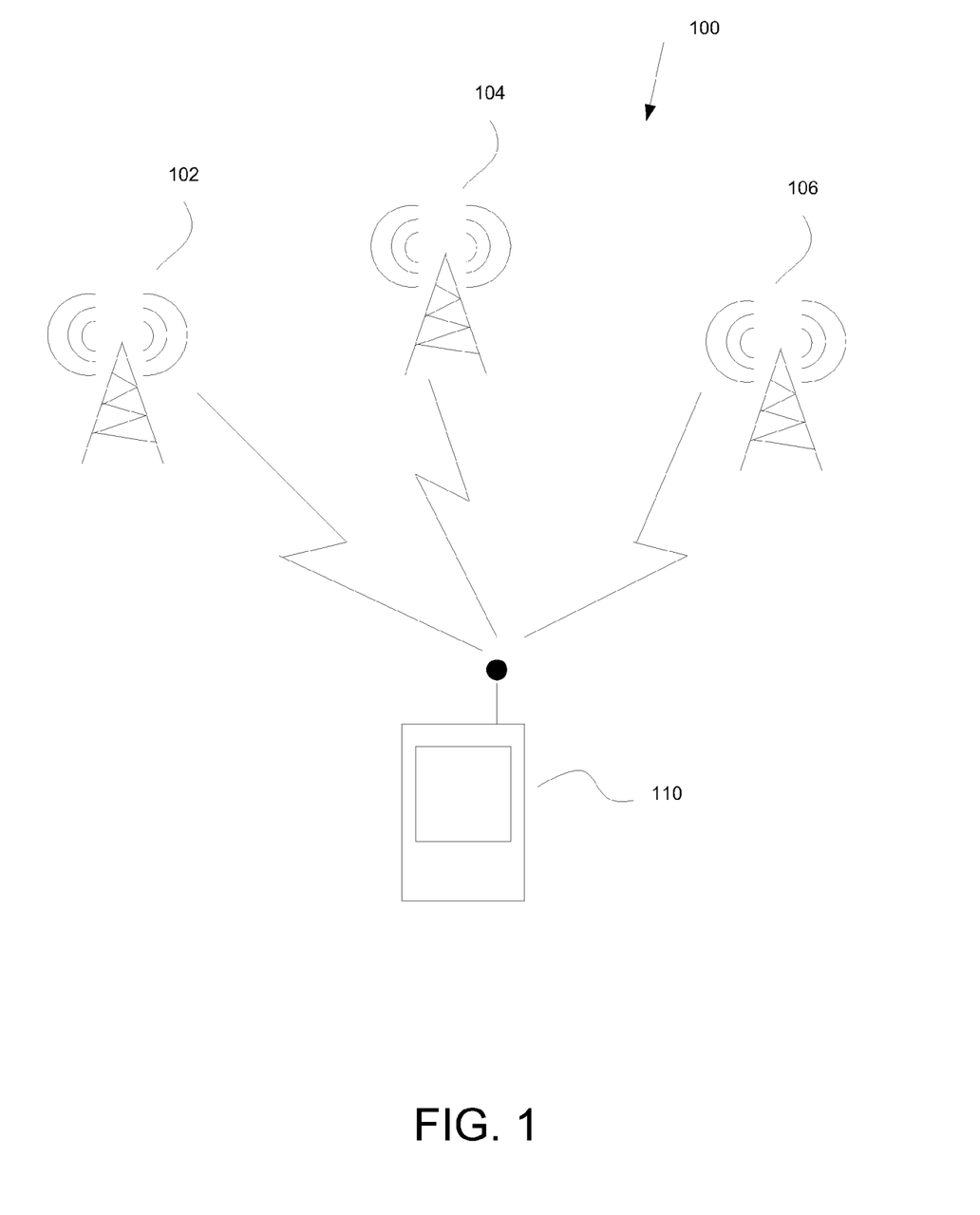
FIG. 1 is a block diagram of a plurality of wireless systems that are available to a wireless communication device, wherein the systems may comprise one or more types of wireless systems, in accordance with one embodiment of the present disclosure.

FIG. 1 is a block diagram of a plurality of wireless systems 100 that is available to a wireless communication device 110, wherein the systems may comprise one or more types of wireless systems, in accordance with one embodiment of the present disclosure. In particular, the communication device 110 includes a wireless receiver (not shown) that is configured to receive signals from one or more wireless systems. In some embodiments, wireless device 110 comprises a wireless transceiver that is configured to transmit and receive signals between the plurality of wireless systems 100 and device 110.

The wireless systems may include one or more types of systems, such as those providing voice services, data services, messaging, or any other type of services. For instance, wireless systems that provide circuit-switched voice service include second-generation wireless telephony technology (2G) systems such as Code Division Multiple Access (CDMA) and GSM, and third-generation telephony technology 3G such as CDMA2000 and UMTS. Also, systems that can provide the data service include 2G, 3G, fourth generation telephony technology (4G), also known as long term evolution (LTE), evolution data optimized (EVDO), Wi-Fi, etc. Still other types of wireless systems are contemplated.

As shown in FIG. 1, various wireless systems are available to the wireless communication device 110. For instance, systems 102, 104, and 106 are shown broadcasting signals to the wireless receiver in device 110. Each of the systems 102, 104, and 106 support a type of service, such as, voice, data, messaging, etc. As an example, system 102 may provide voice services using CDMA to devices within its signal reach, and system 104 may provide data services using LTE, and system 106 may provide other data services using Wi-Fi. Other combinations of voice and data systems available to device 110 are contemplated.

Additionally, the multi-mode receiver in wireless communication device 110 is capable of operating in simultaneous mode. That is, the term "simultaneous" indicates that the wireless receiver has more than one wireless technology systems (e.g., combinations of CDMA, 2G, 3G, 4G, EVDO, Wi-Fi, etc.) that is active on the device 110 at the same time. For example, device 110 may select one or more voice systems for communication. Additionally, device 110 may select one or more data systems for communication. As such, device 110 may be connected to one or more voice systems, and/or one or more data systems when operating in a simultaneous mode.

Embodiments of the present invention provide for a wireless device 110 to smartly and dynamically select among multiple wireless technology systems that are available to the device 110 at any one time, especially when operating in an idle mode. In particular, the wireless device 110 is able to determine which wireless technology systems to camp on that has in combination the most favorable (e.g., least) power penalty when operating in idle mode. In one implementation, the wireless device 110 is able to determine which wireless technology systems to camp on that when combined consumes the least power when performing periodic page monitoring wake-up sequences when the device 110 is operating in an idle mode.

Figure 2:
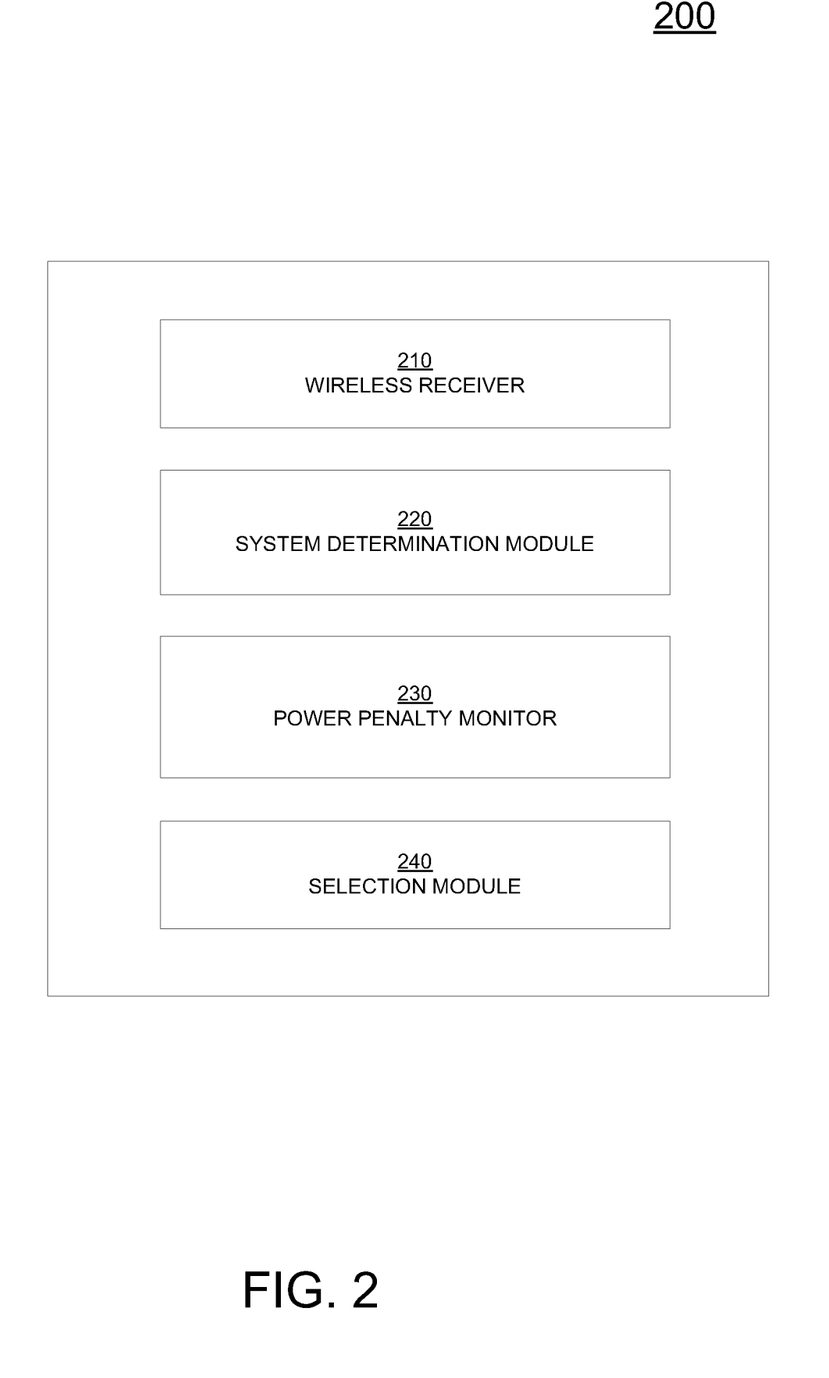
FIG. 2 is an apparatus configured for implementing power management when selecting wireless technology systems to camp on during an idle mode, in accordance with one embodiment of the present disclosure.

FIG. 2 is an apparatus 200 configured for implementing power management, in accordance with one embodiment of the present disclosure. In particular, apparatus 200 is able to select wireless technology systems by considering the power penalty associated with performing page monitoring wake up sequences for various combinations of multiple wireless technology systems that are available to the device. The preferred combination that is selected provides for efficient use of the power available to the apparatus 200, which in one implementation is a wireless, mobile device.

As shown in FIG. 2, apparatus 200 includes a wireless receiver 210 that is configured to receive signals from a plurality of wireless technology systems. At any point in time, each of the wireless technology systems may or may not be available to the apparatus 200 depending on the location of the apparatus and the network topologies of the wireless systems.

In particular, receiver 210 is configured to receive page notifications from one or more wireless technology systems. A wireless system broadcasts page signals or notifications that indicate to a target device that a connection should be established between the target device and the network. The page signals or notifications are provided on a periodic basis for each network. For instance, a voice connection is requested with the apparatus, or data is available for the apparatus. When apparatus 200 is in an idle mode, it undergoes a wake-up sequence at a scheduled time in order to receive the periodic page notifications from a corresponding wireless network of a specific technology. This is possible, since the corresponding wireless system sends page notifications on a scheduled and periodic basis.

Apparatus 200 also includes a system determination module 220 for determining wireless technology systems that are available to the wireless receiver. Further, system determination module 220 is able to determine which wireless systems are available within a particular type of service. For instance, module 220 is able to determine all of the available systems supporting a voice type of service, a data type of service, or any other suitable type of service.

Additionally, the system determination module 220 is configured to determine one or more combinations of wireless technology systems selected from the plurality of wireless technology systems. For instance, combinations may include one or more wireless technology systems taken from the various types of wireless technology systems. In one embodiment, at least one wireless technology system that is available to the apparatus 200 for each type of service is included in each combination. In another embodiment, at least one wireless technology system of a first type, and/or at least one wireless technology system of a second type, and/or at least one wireless technology system of a third type of wireless technology system is included in a combination. In still another embodiment, one or more wireless systems may be available for a given type of service. In one embodiment, a wireless technology system supporting voice services (a first type) and a wireless technology system supporting data service (a second type) is selected for each combination.

Apparatus 200 also includes a power penalty monitor 230 for determining a power penalty for each of the plurality of wireless technology systems. Specifically, the power penalty for a corresponding wireless technology system is associated with a page monitoring wake-up sequence performed while the apparatus 200 is in an idle mode. That is, depending on the frequency of page signaling conducted by a corresponding wireless technology system, apparatus 200 will wake-up from an idle state in order to perform page monitoring, or monitoring of page signals from the corresponding wireless technology system. Afterwards, apparatus 200 returns to the idle state to efficiently use power.

Figure 6:
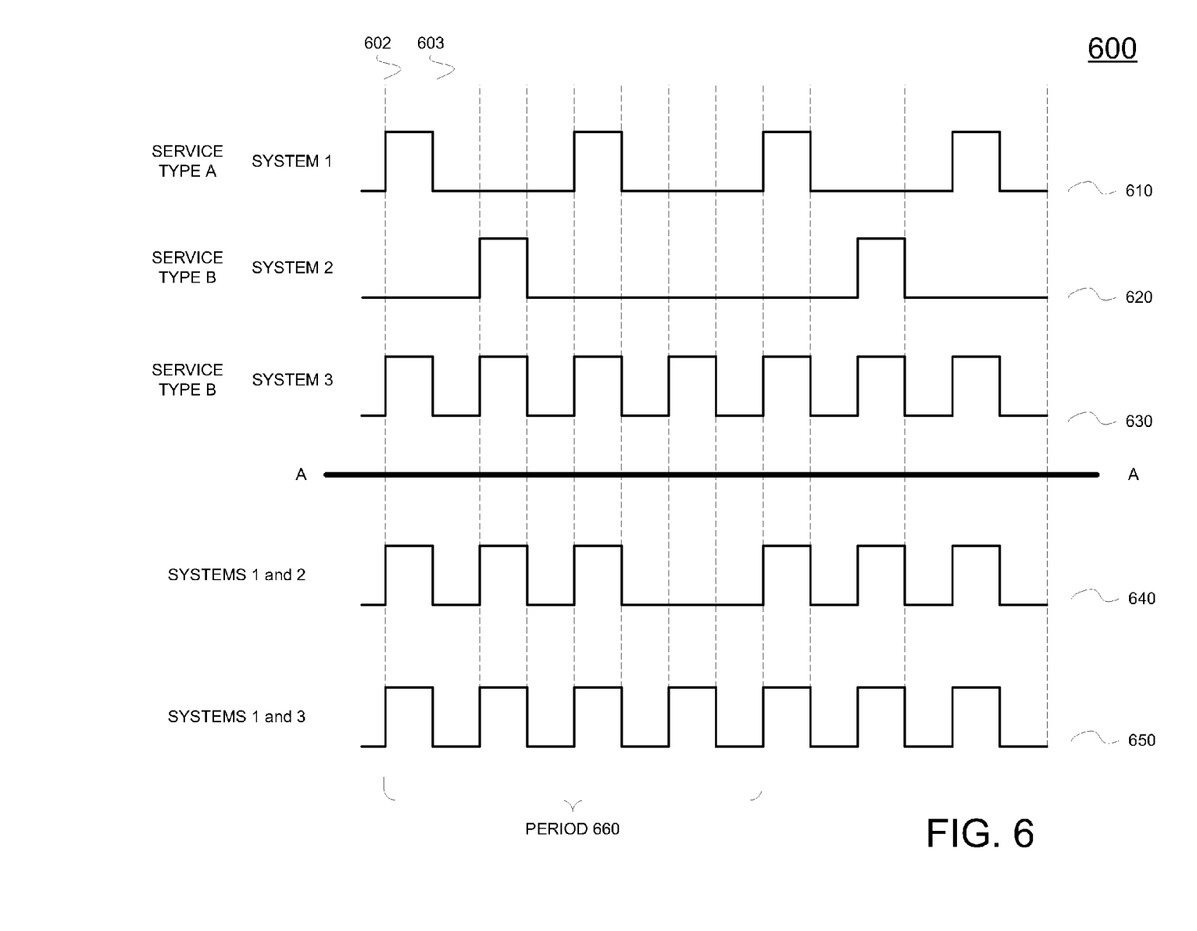
FIG. 6 is a signal diagram illustrating exemplary power penalties for various wireless technology systems and illustrating exemplary combined power penalties for various combinations of wireless technology systems, in accordance with one embodiment of the present disclosure.

In one embodiment, the power penalty comprises a duty cycle as will be further described in relation to FIG. 6. That is, a power penalty is determined based on the duty cycle associated with a page monitoring wake-up sequence for a corresponding wireless technology system. In another embodiment, the power penalty comprises energy consumption as will be further described in relation to FIG. 7. That is, a power penalty is determined based on the energy consumption associated with a page monitoring wake-up sequence for a corresponding wireless technology system.

In one embodiment, the power penalty monitor comprises a look-up table (LUT) that includes information related to the power penalty associated with each of the wireless technology systems. For instance, in one implementation, the LUT includes the average energy (i.e. power*time) use during a page monitoring cycle for a corresponding wireless technology system. LUT is one piece of information for power penalty monitor, the other piece is duty cycle and the wireless receiver device gets the duty cycle information directly from wireless system through broadcast messages.

Apparatus 200 also includes a selection module 240 for determining a preferred combination of wireless technology systems to camp on while in an idle mode. Specifically, module 240 determines one or more combined power penalties for the various combinations of wireless technology systems. For instance, in one embodiment, combinations include one available wireless technology system from each of the voice type technology service and data type technology service. For each combination, a combined power penalty is determined based on the individual power penalties included in the combination. In one embodiment, the operations performed by the selection module 240 is either wholly or partly performed by the system determination module 220.

In one embodiment, the preferred combination has the most favorable or least combined power penalty. That is, the preferred combination comprises selected wireless technology systems that in combination have the least combined power penalty. In one embodiment, each of the selected wireless technology systems in the combination is also associated with the lowest power penalty for an associated type of wireless technology system. For instance, if the combination includes a wireless technology system supporting a voice type of technology system and a wireless technology system supporting a data type, then each of the selected wireless technology systems is also associated with the lowest power penalty for an associated voice or data type of wireless technology systems.

In one embodiment, the determination of the most favorable combined power penalty may be combined with other factors or parameters to determine the preferred combination. For instance, additional parameters include signal quality, technology mode/band preference, scheduling quality of service (QoS), etc.

In one embodiment, the combined power penalty comprises a combined duty cycle as will be further described in relation to FIG. 6. That is, a combined power penalty is determined based on the combined duty cycle associated with page monitoring wake-up sequences for a corresponding combination of wireless technology systems. In another embodiment, the combined power penalty comprises energy consumption as will be further described in relation to FIG. 7. That is, a power penalty is determined based on the energy consumption associated with a page monitoring wake-up sequence for a corresponding combination of wireless technology systems.

Figure 3:
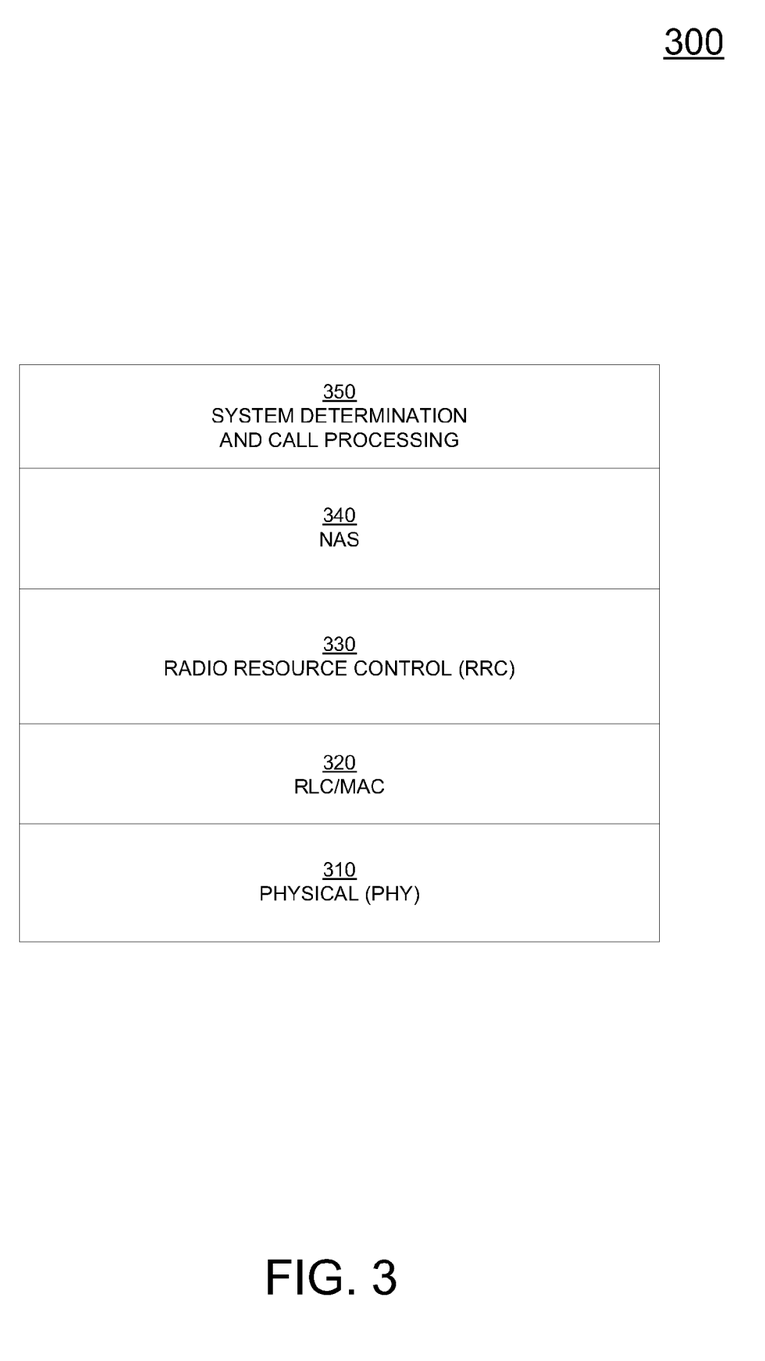
FIG. 3 is an illustration of a portion of a protocol stack for a generic wireless system including the system determination layer implementing power management, in accordance with one embodiment of the present disclosure.

FIG. 3 is an illustration of a portion of a protocol stack 300 for a generic wireless system and including the system determination layer implementing power management, in accordance with one embodiment of the present disclosure. In one embodiment, the protocol stack 300 is implementable within apparatus 200 of FIG. 2 for purposes of power management through the selection of wireless technology systems to camp on while the apparatus 200 is in an idle mode.

As shown in FIG. 3, the bottom four layers include the physical (PHY) layer 310, the radio link control/medium-access control (RLC/MAC) layer 320, radio resource control (RRC) layer 330, and non-access stratum (NAS) layer 340. In some embodiments, these four layers are included within most or all wireless technology systems, to include CDMA, 2G, 3G, 4G, LTE, etc. Generally, the PHY layer 310 is the lowest layer and provides for basic hardware transceiver functions, such as, data transfer over air interface to a network node. The RLC/MAC layer 320 resides above the PHY layer 310, and provides for, in part, defining the basic transport unit over the air interface used to carry data and RLC/MAC signaling between the wireless telecommunications device and the wireless technology systems. For instance, the RLC/MAC 320 provides for segmentation and reassembly of packets, as well as switching, formatting, and mapping between logical channels and transport channels. The RRC layer 330 resides above the RLC/MAC layer 320 and provides for control plane signaling for layer 1 and layer 2 protocol elements and entities. For instance, the RRC layer 330 provides for delivering messages associated with requesting and setting up a connection between the network and the wireless device. The NAS layer 340 resides above the RRC layer 330 and provides for signaling and coordinating traffic between the wireless device and the network technology system.

Protocol stack 300 also includes the system determination and call processing layer 350 that sits above the NAS layer 340. In some embodiments of the invention, power management of a wireless telecommunications device is implemented through the selection of the one or more wireless technology system to camp on during an idle mode is performed at layer 350. For instance, methods for implementing the power management techniques are implemented through the system determination and call processing layer 350. A more detailed description of the methods of power management is provided in relation to FIGS. 4 and 5 below. Power management implementation within the system determination and call processing layer 350 allows for unique modifications to the operations performed by the lower layers 310, 320, 330, and 340 in the protocol stack 300.

Figure 4:
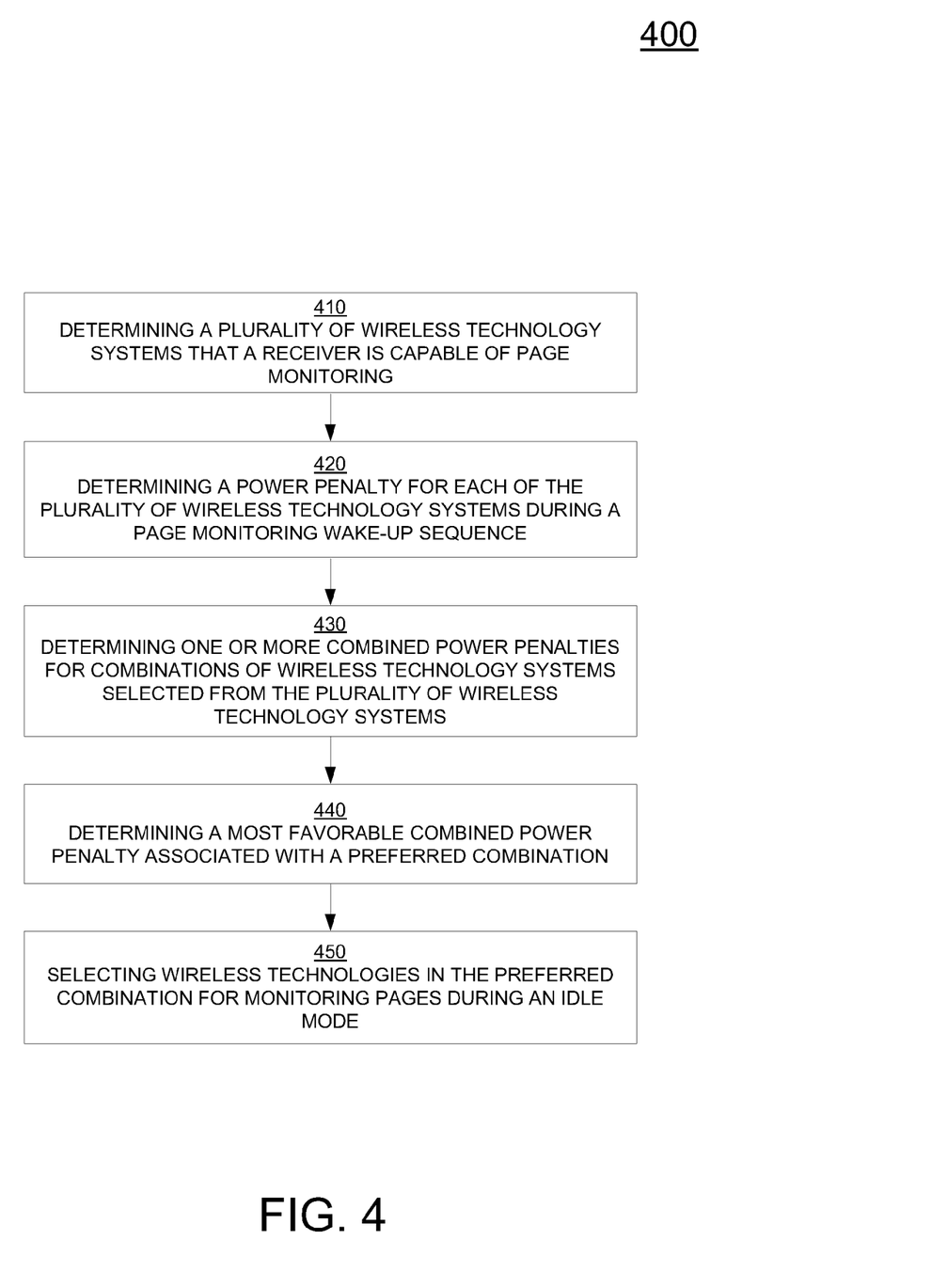
FIG. 4 is a flow diagram illustrating a method of power management when performing system determination to select wireless technology systems to camp on during an idle mode, in accordance with one embodiment of the present disclosure.

FIG. 4 is a flow diagram 400 illustrating a method of power management when performing system determination to select wireless technology systems to camp on during an idle mode, in accordance with one embodiment of the present disclosure. In one embodiment, flow diagram 400 illustrates a computer implemented method of performing system determination for selection of wireless technology systems to camp on during an idle mode, in accordance with one embodiment of the present disclosure. In another embodiment, flow diagram 400 is implemented within a computer system including a processor and memory coupled to the processor and having stored therein instructions that, if executed by the computer system causes the system to execute a method of power management when performing system determination to select wireless technology systems to camp on during an idle mode. In still another embodiment, instructions for performing the method are stored on a non-transitory computer-readable storage medium having computer-executable instructions for causing a computer system to perform a method of power management when performing system determination to select wireless technology systems to camp on during an idle mode, as outlined by flow diagram 400. In some embodiments, the operations of flow diagram 400 are implemented within the wireless communications device 800 of FIG. 8 and/or wireless communication device 200 of FIG. 2.

The method of flow diagram 400 includes determining a plurality of wireless technology systems that a wireless receiver is capable of page monitoring at 410. The identified wireless technologies include systems that are available to the wireless receiver, such that when the wireless receiver is operating in an idle mode, the receiver is configured to wake-up to perform page monitoring over a corresponding system.

The method also includes determining a power penalty for each of the plurality of wireless technology systems at 420. The power penalty is associated with a page monitoring wake-up sequence that is performed when the wireless receiver is operating in an idle mode. In one embodiment, the power penalty comprises a duty cycle. In another embodiment, the power penalty comprises an average power consumption over a period. In still another embodiment, the power penalty comprises energy consumption over an entire page monitoring wake-up sequence. In one embodiment, the power penalties are stored for ready access. For instance, the power penalties for various wireless technology systems in association with a corresponding page monitoring wake-up sequence is stored in an LUT.

At 430, the method also includes determining one or more combined power penalties for combinations of wireless technology systems that are selected from the plurality of wireless technology systems. The determination of a combination includes selecting a wireless technology system for each type of required service, in one embodiment. For instance, a first type supports voice service, and a second type supports data service. As such, the combined power penalty that is determined is based on the individual power penalties of wireless technology systems included in the combination. In one embodiment, the combined power penalty is the sum of the individual power penalties of wireless technology systems included in the combination.

At 440, the method also includes determining a most favorable combined power penalty. Specifically, among the combinations of wireless technology systems that are each associated with a combined power penalty, a preferred combination is associated with the most favorable combined power penalty. For instance, in one embodiment, the most favorable combined power penalty comprises the least combined power penalty.

In one embodiment, determining the most favorable combined power penalty includes determining a combined duty cycle that is associated with page monitoring wake-up sequence for each of the combinations. As such, the preferred combination is associated with a combined duty cycle that has the least or lowest values. The duty cycles are determined over a period that is universal over all the combinations.

In another embodiment, the most favorable combined power penalty is obtained by determining a combined power consumption for page monitoring wake-up sequences for each of the combinations. In one embodiment, the combined power consumption is determined over a period that is universal over all the combinations, wherein the period is defined over a cycle or over the entire course of the wake-up sequences of wireless technology systems in the corresponding combination. As such, the preferred combination consumes the least combined power associated with the wireless technology systems in the combination over a period (e.g., over a cycle or over the entire wake-up sequence).

In one embodiment, the combined power consumption is determined over a period that comprises a cycle. As such, a page monitoring cycle is determined that is associated with the period. The page monitoring cycle is determined for all the wireless technology systems in the corresponding combination. In one embodiment, the page monitor cycle is transmitted to the receiver over the air from system through broadcast system information messages. An average power use may also be determined based on the page monitor cycles for the various wireless technology systems. As such, individual and combined power consumptions are determined based on the average power use for the wireless technology systems during the page monitoring cycle. In one embodiment, this information is stored for ready access (e.g., in an LUT)

In another embodiment, the combined power consumption is determined by selecting a wireless technology system that consumes the least power over a period for each type of wireless technology system included in a corresponding combination. For instance, within a first type of wireless technology system, a first wireless technology system is selected having the least power consumption over the period. Also, within a second type of wireless technology system, a second wireless technology system is selected having the least power consumption over the period. This process is performed for every type of wireless technology system that is included in the combinations. In one example, the combinations include wireless technology systems of first and second types. As such, the preferred combination includes the first wireless technology system and the second wireless technology system.

At 450, the method also includes selecting wireless technology systems in the preferred combination for the wireless receiver to camp on during an idle mode. That is, the wireless receiver is configured to periodically perform a page monitoring wake-up sequence in relation to the page monitoring cycles associated with each of the selected wireless technology systems. As such, the page monitoring wake-up sequences performed for each of the wireless technology systems in the preferred combination makes the most efficient use of power available to the telecommunications device comprising the wireless receiver.

Figure 5:
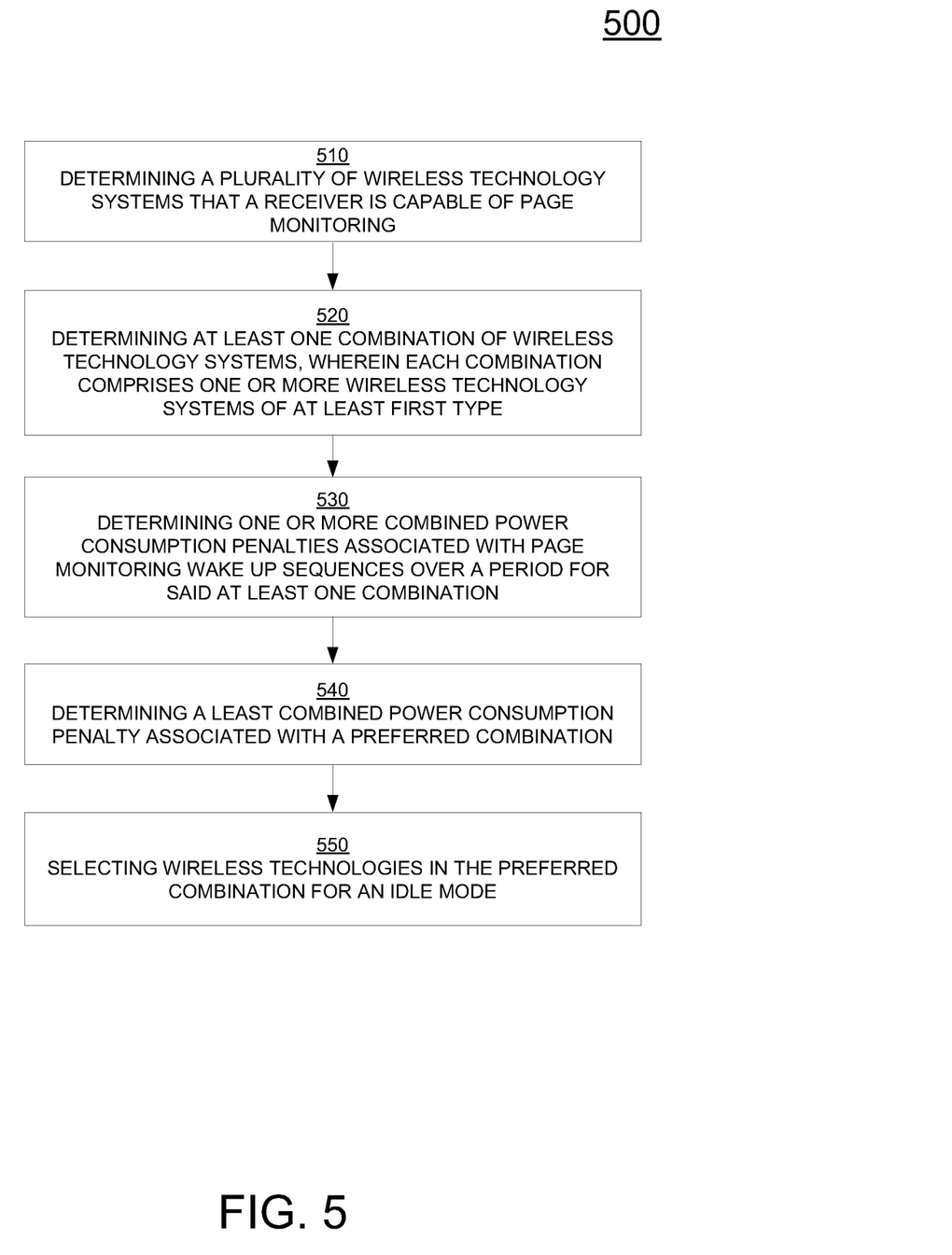
FIG. 5 is a flow diagram illustrating a method of power management when performing system determination to include the consideration of power consumption of wireless technology systems during a page monitoring wake-up sequence, in accordance with one embodiment of the present disclosure.

FIG. 5 is a flow diagram 500 illustrating a method of power management when performing system determination to include the consideration of power consumption of wireless technology systems during a page monitoring wake-up sequence, in accordance with one embodiment of the present disclosure. In one embodiment, flow diagram 500 illustrates a computer implemented method of performing system determination for selection of wireless technology systems to camp on during an idle mode, in accordance with one embodiment of the present disclosure. In another embodiment, flow diagram 500 is implemented within a computer system including a processor and memory coupled to the processor and having stored therein instructions that, if executed by the computer system causes the system to execute a method of power management when performing system determination to select wireless technology systems to camp on during an idle mode. In still another embodiment, instructions for performing the method are stored on a non-transitory computer-readable storage medium having computer-executable instructions for causing a computer system to perform a method of power management when performing system determination to select wireless technology systems to camp on during an idle mode, as outlined by flow diagram 500. In some embodiments, the operations of flow diagram 500 are implemented within the wireless communications device 800 of FIG. 8 and/or wireless communication device 200 of FIG. 2.

The method of flow diagram 500 includes determining a plurality of wireless technology systems that a wireless receiver is capable of page monitoring at 510. The identified wireless technology systems include systems that are available to the wireless receiver, such that when the wireless receiver is operating in an idle mode, the receiver is configured to wake-up to perform page monitoring.

The method includes determining at least one combination of wireless technology systems, wherein each combination comprises one or more wireless technology systems of at least a first type. In another embodiment, each combination comprises one or more wireless technology systems of at least a first type and a second type. For instance, each combination comprises a wireless technology system of a first type supporting voice services, and a second type supporting data services.

At 530, the method also includes determining one or more combined power penalties associated with page monitoring wake-up sequences over a period for combinations of wireless technology systems that are selected from the plurality of wireless technology systems. The determination of a combination includes selecting a wireless technology system for each type of wireless technology, in one embodiment. For instance, a first type supports voice service, and a second type supports data service. As such, the combined power penalty that is determined is based on the individual power penalties of wireless technology systems included in the combination. In one embodiment, the combined power penalty is the sum of the individual power penalties of wireless technology systems included in the combination.

At 540, the method also includes determining a least combined power consumption penalty. Specifically, among the combinations of wireless technology systems that are each associated with a combined power penalty, a preferred combination is associated with the least consumption of combined power over the period. For instance, for a given combination, the combined power consumption is determined over a period, wherein the period is defined over a cycle or over the entire course of the wake-up sequences of wireless technology systems in the corresponding combination. As such, the preferred combination is the one that consumes the least combined power associated with the wireless technology systems in the combination over a period (e.g., over a cycle or over the entire wake-up sequence).

At 550, the method also include selecting wireless technology systems in the preferred combination for the wireless receiver to camp on during an idle mode. That is, the wireless receiver is configured to periodically perform a page monitoring wake-up sequence in relation to the page monitoring cycles associated with each of the selected wireless technology systems. As such, the page monitoring wake-up sequences performed for each of the wireless technology systems in the preferred combination makes the most efficient use of power available to the telecommunications device comprising the wireless receiver.

FIG. 6 is a signal diagram 600 illustrating exemplary power penalties for various wireless technology systems and illustrating exemplary combined power penalties for various combinations of wireless technology systems, in accordance with one embodiment of the present disclosure. As such, in FIG. 6, duty cycles are shown for various signals and are used to determine corresponding power penalties, and to determine the most favorable combined power penalty of a preferred combination. More particularly, the combined duty cycle as determined for each combination of wireless technology systems is associated with page monitoring wake-up sequences.

As shown in FIG. 6, vertical lines form intervals over which a page monitoring wake-up sequence duty cycle is determined. For illustration purposes only, the interval between two vertical lines (e.g., 602 and 603) is a one-second interval, though the interval may comprise any consistent time interval. In this manner, a duty cycle is determined for each of the wireless technology systems supported by the corresponding wireless telecommunications device, wherein a duty cycle is defined by the amount of time spent operating in a given mode, such as when performing page monitoring during a wake-up sequence, in comparison to an overall period of time 660. In one embodiment, the overall period is a universal period consistent over each of the wireless technology systems, and the various combinations of the wireless technology systems.

As shown in diagram 600, duty cycle waveforms are shown above line A-A for each wireless technology system that a wireless telecommunications device is configured to support. For instance, duty cycle waveform 610 is associated with system 1 that provides a Type A service, such as, voice services. The associated duty cycle over universal period 660 for waveform 610 with regards to performing page monitoring wake-up sequence while a device is an idle mode is approximately ¼. Duty cycle waveform 620 is associated with system 2 that provides a Type B service, such as, data services. The associated duty cycle for waveform 620 with regards to performing page monitoring wake-up sequence while a device is an idle mode is approximately ⅛. Duty cycle waveform 630 is associated with system 3 that provides a Type B service. The associated duty cycle for waveform 630 with regards to performing page monitoring wake-up sequence while a device is an idle mode is approximately ½.

In one embodiment, combinations include wireless technology systems of each of a first and second type of service. For instance, each combination includes at least one wireless technology system of a first type (e.g., voice services) and at least one wireless technology system of a second type (e.g., data services). Using the waveforms provided in FIG. 6, there is only one wireless technology system supporting Type A service, and as such, all combinations include the wireless technology system 1. On the other hand, there are two wireless technology systems supporting Type B services. As such, combinations include a first combination of wireless technology systems 1 and 2; and a second combination of wireless technology systems 1 and 3.

In one embodiment, determining the most favorable combined power penalty includes determining a combined duty cycle that is associated with page monitoring wake-up sequence for each of the combinations. A preferred combination is associated with a combined duty cycle that has the least or lowest values. As shown in diagram 600, combined duty cycle waveforms are shown below line A-A for each combination of wireless technology systems that a wireless telecommunications device is configured to support in simultaneous mode. For instance, duty cycle waveform 640 is associated with the first combination of wireless technology systems 1 and 2 providing voice and data services. The associated duty cycle for waveform 640 with regards to performing page monitoring wake-up sequences for both systems 1 and 2 while a device is an idle mode is approximately ⅜. Duty cycle waveform 650 is associated with the second combination of wireless technology systems 1 and 3 providing voice and data services. The associated duty cycle for waveform 650 with regards to performing page monitoring wake-up sequences for both systems 1 and 3 while a device is in an idle mode is approximately ½.

A preferred combination with the most favorable power penalty is associated with the lowest combined duty cycle. The combined duty cycle of the first combination of systems 1 and 2 (⅜) is lower than the combined duty cycle of the second combination of systems 1 and 3 (½). As such, the first combination of systems 1 and 2 is the preferred combination.

Figure 7:
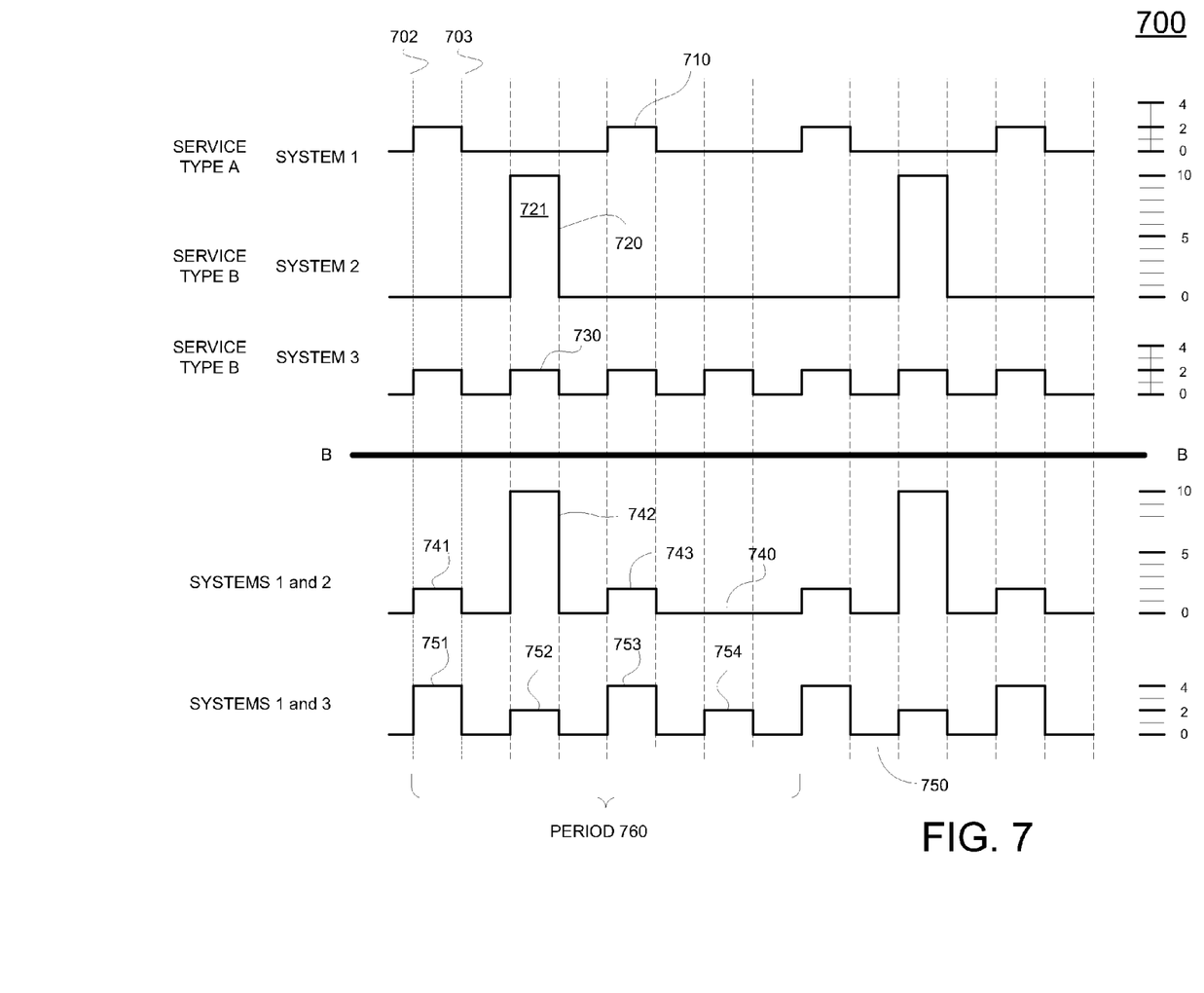
FIG. 7 is a signal diagram illustrating exemplary power consumption penalties for various wireless technology systems and illustrating exemplary combined power consumption penalties for various combinations of wireless technology systems, in accordance with one embodiment of the present disclosure.

FIG. 7 is a signal diagram 700 illustrating exemplary power consumption penalties for various wireless technology systems and illustrating exemplary combined power consumption penalties for various combinations of wireless technology systems, in accordance with one embodiment of the present disclosure. As such, in FIG. 7, power consumption is shown for various signals are used to determine corresponding power consumption penalties, and to determining the most favorable or lest combined power consumption penalty of a preferred combination. More particularly, the combined power consumption as determined for each combination of wireless technology systems is associated with page monitoring wake-up sequences.

As shown in FIG. 7, vertical lines form intervals over which a page monitoring wake-up sequence is shown. For illustration purposes only, the interval between two vertical lines (e.g., 702 and 703) can be any time consistent interval (e.g., a one-second interval). In this manner, power consumption is determined by the area occupied by a corresponding waveform over a 0 value. Relative power values between 0-10 are provided for reference on the vertical axis. For instance, the power values may indicate current (amps) or power (wattage). As such, total energy consumption is determined by the power value exerted over a period of time, or the area occupied by a corresponding waveform, such as, the area 721 of waveform 720.

As shown in diagram 700, power waveforms are shown above line B-B for each wireless technology system that a wireless telecommunications device is configured to support. For instance, power waveform 710 is associated with system 1 that provides a Type A service, such as, voice services. The highest power level for waveform 710 with regards to performing page monitoring wake-up sequence while a device is an idle mode is approximately a level 2. The wake-up sequence occurs twice in a universal period 760.

Power waveform 720 is associated with system 2 that provides a Type B service, such as, data services. The highest power level for waveform 720 with regards to performing page monitoring wake-up sequence while a device is an idle mode is approximately a level 10. The wake-up sequence occurs once in a universal period 760. Power waveform 730 is associated with system 3 that provides a Type B service. The highest power level for waveform 710 with regards to performing page monitoring wake-up sequence while a device is an idle mode is approximately a level 2. The wake-up sequence occurs four times in a universal period 760

In one embodiment, combinations include wireless technology systems of each of a first and second type of service. For instance, each combination includes at least one wireless technology of a first type (e.g., voice services) and at least one wireless technology system of a second type (e.g., data services). Using the waveforms provided in FIG. 7, combinations include a first combination of wireless technology systems 1 and 2; and a second combination of wireless technology systems 1 and 3.

In one embodiment, determining the most favorable combined power consumption penalty includes determining a combined power penalty that is associated with page monitoring wake-up sequence for each of the combinations. A preferred combination is associated with a combined power consumption penalty that has the least or lowest value. As shown in diagram 700, combined power consumption waveforms are shown below line B-B for each combination of wireless technology systems that a wireless telecommunications device is configured to support in simultaneous mode. For instance, power consumption waveform 740 is associated with the first combination of wireless technology systems 1 and 2 providing voice and data services. As shown, three wake-up sequences 741, 742, and 743 are performed for waveform 740. Sequences 741 and 743 are associated with power consumption levels of 2, and sequence 742 is associated with a power consumption level of 10. As such, over period 760, the total power consumption penalty (power multiplied by time, or area) is approximately 14, given a time interval of 1 for simplicity.

Power consumption waveform 750 is associated with the second combination of wireless technology systems 1 and 3 providing voice and data services. As shown, three wake-up sequences 751, 752, 753, and 754 are performed for waveform 750. Sequences 751 and 753 are associated with power consumption levels of 4, and sequences 752 and 754 are associated with a power consumption level of 2. As such, over period 760, the total power consumption penalty (power multiplied by time, or area) is approximately 12, given a time interval of 1 for simplicity.

A preferred combination with the most favorable power consumption penalty is associated with the lowest combined power consumption penalty. The combined power consumption penalty of the first combination of systems 1 and 2 (14) is higher than the combined power consumption penalty of the second combination of systems 1 and 3 (12). As such, the second combination of systems 1 and 3 is the preferred combination.

The determination of power penalties as shown in FIGS. 6 and 7 may give different results for the same wireless telecommunications device operating in the same environment. For instance, when looking at duty cycles as shown in FIG. 6, the preferred combination includes systems 1 and 2, whereas when looking a power consumption as shown in FIG. 7, the preferred combination includes systems 1 and 3. In one embodiment, determining power penalties based on power consumption gives a better representation of power usage for a particular telecommunications device.

Figure 8:
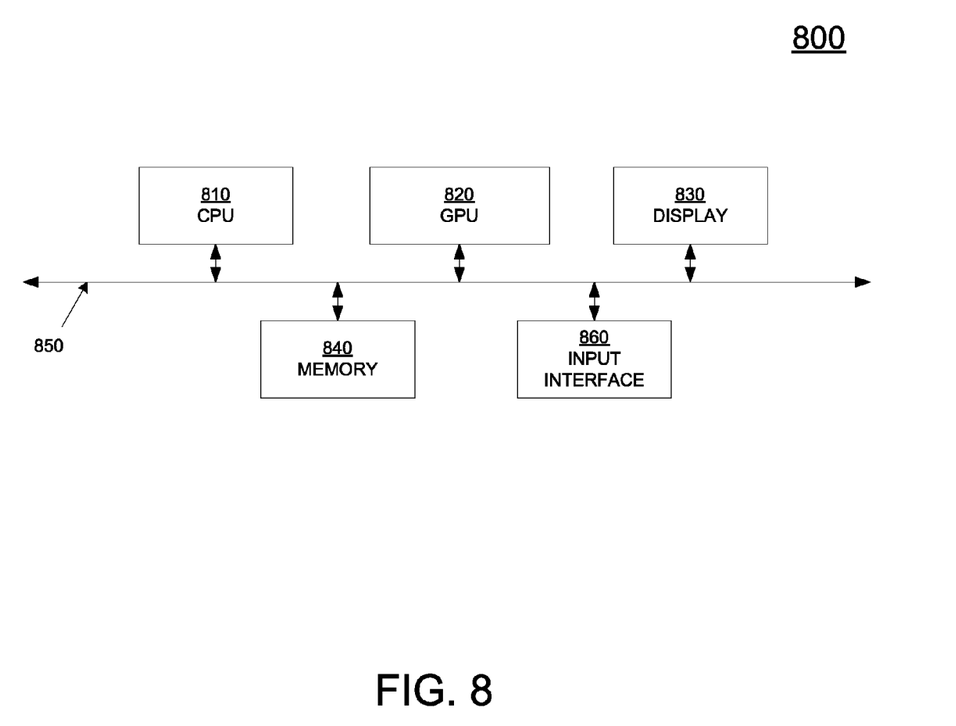
FIG. 8 depicts a block diagram of an exemplary wireless communications device suitable for implementing the present methods, in accordance with one embodiment of the present disclosure.

FIG. 8 is a block diagram of an example of a wireless communications device 800 capable of implementing embodiments of the present disclosure. Communications device 800 broadly represents any single or multi-processor computing device or system capable of executing computer-readable instructions. Examples of wireless communications device 800 include, without limitation, workstations, laptops, client-side terminals, servers, distributed computing systems, handheld devices, or any other computing system or device. In its most basic configuration, wireless communications device 800 may include at least one processor 810 and a system memory 840.

Both the central processing unit (CPU) 810 and the graphics processing unit (GPU) 820 are coupled to memory 840. System memory 840 generally represents any type or form of volatile or non-volatile storage device or medium capable of storing data and/or other computer-readable instructions. Examples of system memory 840 include, without limitation, RAM, ROM, flash memory, or any other suitable memory device. In the example of FIG. 8, memory 840 is a shared memory, whereby the memory stores instructions and data for both the CPU 810 and the GPU 820. Alternatively, there may be separate memories dedicated to the CPU 810 and the GPU 820, respectively. The memory can include a frame buffer for storing pixel data drives a display screen 830.

The wireless communications device 800 includes a user interface 860 that, in one implementation, includes an on-screen cursor control device. The user interface may include a keyboard, a mouse, and/or a touch screen device (a touchpad).

CPU 810 and/or GPU 820 generally represent any type or form of processing unit capable of processing data or interpreting and executing instructions. In certain embodiments, processors 810 and/or 820 may receive instructions from a software application or hardware module. These instructions may cause processors 810 and/or 820 to perform the functions of one or more of the example embodiments described and/or illustrated herein. For example, processors 810 and/or 820 may perform and/or be a means for performing, either alone or in combination with other elements, one or more of the monitoring, determining, gating, and detecting, or the like described herein. Processors 810 and/or 820 may also perform and/or be a means for performing any other steps, methods, or processes described and/or illustrated herein.

In some embodiments, the computer-readable medium containing a computer program may be loaded into wireless communications device 800. All or a portion of the computer program stored on the computer-readable medium may then be stored in system memory 840 and/or various portions of storage devices. When executed by processors 810 and/or 820, a computer program loaded into wireless communications device 800 may cause processor 810 and/or 820 to perform and/or be a means for performing the functions of the example embodiments described and/or illustrated herein.

Additionally or alternatively, the example embodiments described and/or illustrated herein may be implemented in firmware and/or hardware.

Embodiments of the present disclosure may be implemented by using hardware only or by using software and a necessary universal hardware platform. Based on such understandings, the technical solution of the present invention may be embodied in the form of a software product. The software product includes a number of instructions that enable a computer device (personal computer, server, or network device) to execute the method provided in the embodiments of the present disclosure.

Embodiments described herein may be discussed in the general context of computer-executable instructions residing on some form of computer-readable storage medium, such as program modules, executed by one or more computers or other devices. By way of example, and not limitation, the software product may be stored in a nonvolatile or non-transitory computer-readable storage media that may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), USB flash disk, digital versatile disks (DVDs) or other optical storage, magnetic cassettes, magnetic tape, removable hard disk, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Thus, according to embodiments of the present disclosure, apparatus and methods are described which illustrate the implementation of a system selection technique that considers power penalties in order to reduce power consumption of any multi-mode wireless receiver when operating in simultaneous mode. Embodiments of the present invention provide for dynamic selection of wireless technology systems to camp on for a multi-mode wireless receiver when operating in simultaneous mode.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present invention and its advantages have been described in detail, it should be understood that various changes substitutions, and alterations can be made herein without departing from the spirit and scope of the invention as defined by the appended claims. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. An apparatus, comprising:
a wireless receiver configured for receiving signals from a plurality of wireless technology systems;
a system determination module for determining wireless technology systems for each type of wireless technology that are available to said wireless receiver, wherein said system determination module is configured to determine one or more combinations of wireless technology systems selected from said plurality of wireless technology systems;
a power penalty monitor for determining a power penalty for each of said plurality of wireless technology systems during a page monitoring wake-up sequence;
a selection module for determining one or more combined power penalties for combinations of wireless technology systems selected from said plurality of wireless technology systems, wherein a preferred combination comprising selected wireless technology systems has the least combined power penalty, wherein a combined power penalty for a corresponding combination as determined by said selection module comprises a combined power consumption for page monitoring wake-up sequences for each wireless technology system in said corresponding combination, and wherein said combined power consumption is based on a page monitoring cycle and an average power use during said page monitoring cycle over a period.

2. The apparatus of claim 1, wherein a combined power penalty for a corresponding combination as determined by said selection module comprises a combined duty cycle associated with page monitoring wake-up sequences for each wireless technology system in said corresponding combination.

3. The apparatus of claim 1, further comprising:
a look-up table comprising said page monitoring cycle and said average power use for said corresponding combination.

4. The apparatus of claim 1, further comprising a wireless communications protocol stack including a system determination and call processing layer through which said determining a power penalty by said power penalty monitor and said determining one or more combined power penalties by said selection module are performed.

5. The apparatus of claim 1, wherein selection of selected wireless technology systems in said preferred combination is based on satisfying at least one QoS parameter.

6. A method for power management performed in a wireless communications device, comprising:
determining a plurality of wireless technology systems that a receiver is capable of page monitoring;
determining a power penalty for each of said plurality of wireless technology systems during a page monitoring wake-up sequence;
determining one or more combined power penalties for combinations of wireless technology systems selected from said plurality of wireless technology systems;
determining a most favorable combined power penalty associated with a preferred combination by determining a combined power consumption for page monitoring wake-up sequences for each of said combinations over a period, wherein said preferred combination consumes the least combined power over said period, wherein said determining a combined power consumption further comprises:
for each wireless technology system in a combination, determining a page monitoring cycle;
determining an average power use during said page monitoring cycle; and
calculating said combined power consumption based on said page monitoring cycle and average power use; and
selecting wireless technology systems in said preferred combination for monitoring pages during an idle mode.

7. The method of claim 6, wherein said determining a most favorable combined power penalty comprises:
determining a combined duty cycle associated with page monitoring wake-up sequences for each of said combinations; and
selecting said preferred combination such that a corresponding combined duty cycle has the least duty cycle.

8. The method of claim 6, further comprising:
accessing said page monitoring cycle and said average power use in a look up table.

9. The method of claim 6, wherein said determining a most favorable combined power penalty further comprises:
selecting a first wireless technology system of a first type having a least power consumption over a period;
selecting a second wireless technology system of a second type having a least power consumption over said period; and
selecting said first wireless technology system and said second wireless technology system in said preferred combination.

10. The method of claim 9, further comprising:
selecting a third wireless technology system of a third type having a least power consumption over said period; and
selecting said third wireless technology system in said preferred combination.

11. The method of claim 6, wherein said determining a most favorable combined power penalty is performed within a system determination and call processing layer of a wireless communications protocol stack.

12. The method of claim 6, further comprising:
selecting said preferred combination based on satisfying at least one QoS parameter.

13. A method for power management in a wireless communications device, comprising:
determining a plurality of wireless technology systems that a receiver is capable of page monitoring;
determining at least one combination of wireless technology systems, wherein each combination comprises one or more wireless technology systems of at least a first type;
determining one or more combined power consumption penalties associated with page monitoring wake-up sequences over a period for said at least one combination, by:
for each wireless technology system in a corresponding combination, determining a page monitoring cycle over a period;
determining an average power use during said page monitoring cycle; and
calculating a corresponding combined power consumption based on said page monitoring cycle and average power use;
determining a least combined power consumption penalty associated with a preferred combination; and
selecting wireless technology systems in said preferred combination for an idle mode.

14. The method of claim 13, wherein said selecting said preferred combination comprises satisfying at least one QoS parameter.

15. The method of claim 13, wherein said selecting wireless technology systems comprises:
selecting said wireless technology systems for page monitoring during said idle mode.

* * * * *